United States Patent
Ihrke

(10) Patent No.: US 11,129,359 B2
(45) Date of Patent: Sep. 28, 2021

(54) ANIMAL FEEDING AND WATERING CUP SYSTEM

(71) Applicant: Jill Ihrke, Sheffield, IA (US)

(72) Inventor: Jill Ihrke, Sheffield, IA (US)

( * ) Notice: Subject to any disclaimer, the term of this patent is extended or adjusted under 35 U.S.C. 154(b) by 401 days.

(21) Appl. No.: 16/170,334

(22) Filed: Oct. 25, 2018

(65) Prior Publication Data

US 2019/0124884 A1    May 2, 2019

Related U.S. Application Data

(60) Provisional application No. 62/577,538, filed on Oct. 26, 2017.

(51) Int. Cl.
*A01K 1/035* (2006.01)
*A01K 5/01* (2006.01)

(52) U.S. Cl.
CPC .......... *A01K 1/0356* (2013.01); *A01K 5/0135* (2013.01)

(58) Field of Classification Search
USPC ..... 119/61.57, 429, 454, 464–468, 475, 477, 119/57.8, 52.2; D30/133, 124, 127
See application file for complete search history.

(56) References Cited

U.S. PATENT DOCUMENTS

| | | | | |
|---|---|---|---|---|
| 2,773,473 A | * | 12/1956 | Martin | A01K 1/0356 119/464 |
| 3,554,165 A | * | 1/1971 | Carter | A01K 1/0356 119/477 |
| 4,787,337 A | | 11/1988 | Mayer | |
| 4,995,337 A | * | 2/1991 | Abrams | A01K 1/0356 119/477 |
| 5,035,389 A | * | 7/1991 | Wang | F16B 3/00 248/224.51 |
| 5,752,464 A | | 5/1998 | King | |
| 5,832,872 A | * | 11/1998 | Pearce | A01K 1/0356 119/477 |
| 6,067,935 A | | 5/2000 | Rodes | |
| 6,199,510 B1 | * | 3/2001 | Louden | A01K 1/0356 119/51.01 |
| 6,526,911 B2 | * | 3/2003 | Louden | A01K 1/0356 119/51.01 |
| 7,263,949 B1 | | 9/2007 | Seaford | |
| 9,284,968 B2 | * | 3/2016 | Clouser | F16B 3/00 |
| 10,117,415 B2 | * | 11/2018 | Crews | A01K 5/01 |
| 2006/0065207 A1 | * | 3/2006 | Louden | A01K 39/014 119/464 |

OTHER PUBLICATIONS

E-Z Crocks, crock with wedge configuration—Kagewerks, Inc. of 9565 Pathway St., Santee, CA 92071 USA Jan. 1, 2017.

* cited by examiner

*Primary Examiner* — Andrea M Valenti
(74) *Attorney, Agent, or Firm* — Christopher A. Proskey; BrownWinick Law Firm

(57) ABSTRACT

An animal feeding and watering cup system that can be used with any type of cage, crate or enclosure in order to provide food, water, medication or the like to an animal or an inhabitant of the cage, crate or other type of enclosure. The system comprises a cup wherein a plurality of brackets is located on the outer surface of the cup, a connector, and a cage, crate, or enclosure. In one embodiment, the system comprises a cup which is connected to a cage via a plurality of brackets receiving a connector which securely attaches the cup to the cage. In one embodiment, the system comprises a cup which is easily stacked.

16 Claims, 13 Drawing Sheets

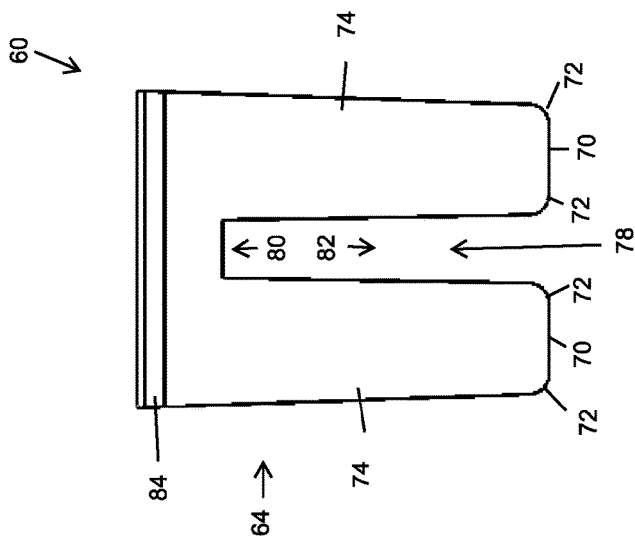
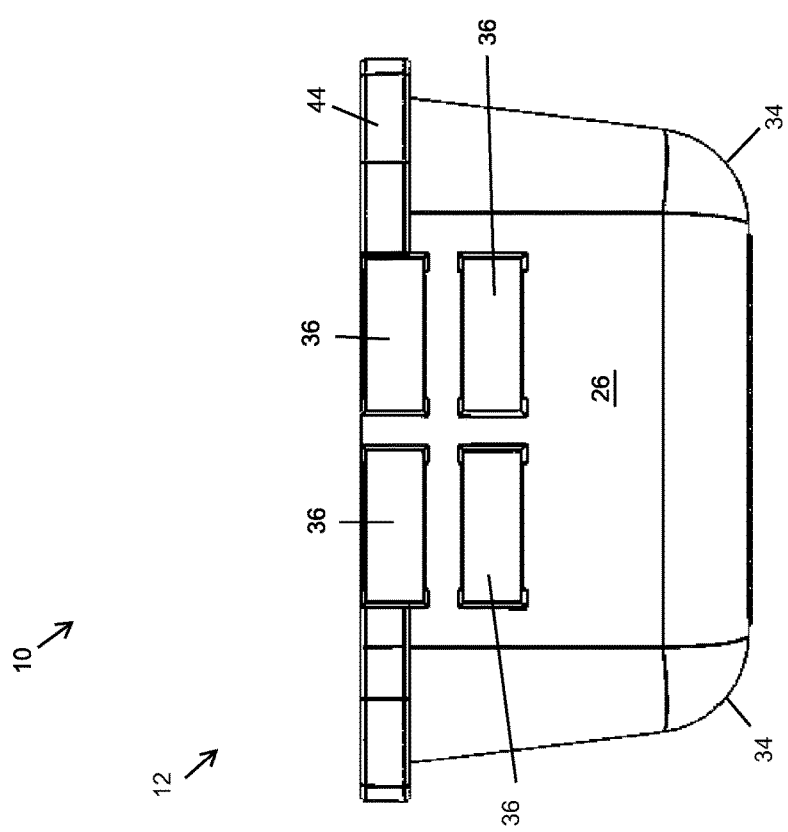
FIGURE 3

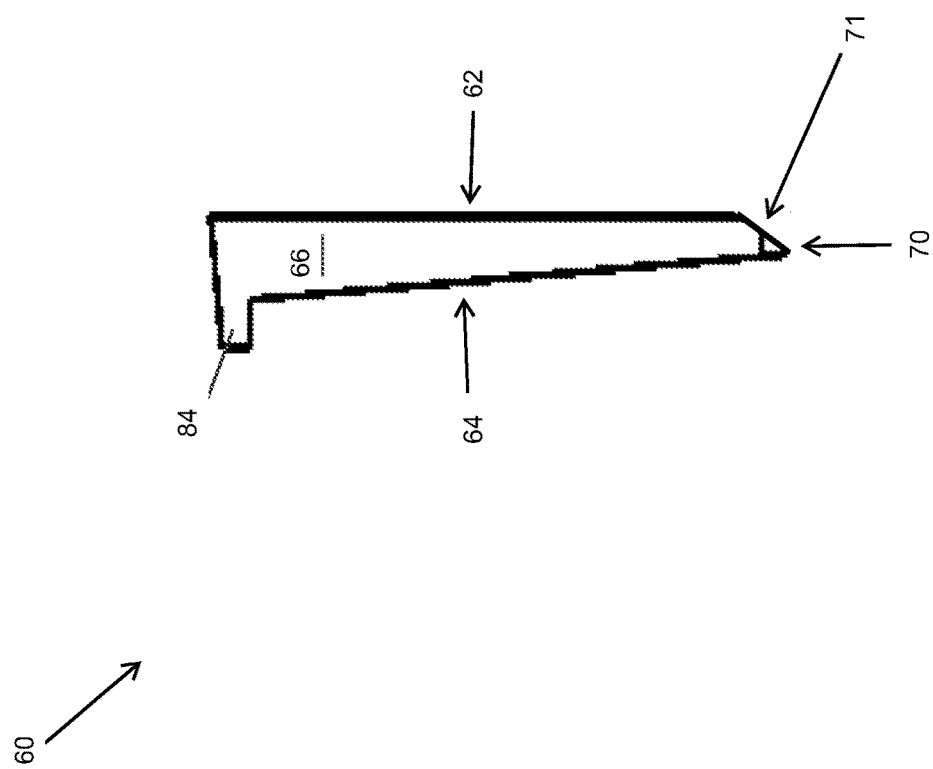

ANIMAL FEEDING AND WATERING CUP SYSTEM

CROSS-REFERENCE TO RELATED APPLICATION

The present application claims the benefit of U.S. Provisional Patent Application No. 62/577,538 filed on Oct. 26, 2017, which is hereby incorporated by reference herein in its entirety, including any figures, tables, or drawings.

FIELD OF THE DISCLOSURE

This disclosure relates generally to an animal feeding and watering cup system, more particularly, and without limitation, to an animal feeding and watering cup system for securely attaching to animal cages of different types.

BACKGROUND OF THE DISCLOSURE

The use of animal food and water holding devices is well known in the prior art. U.S. Pat. No. 5,752,464 describes a device having a pair of hinged containers which may be used for holding food and water for an animal. Another example of an animal food and water holding device is disclosed in U.S. Pat. No. 7,263,949 which provides for an animal food and water holding device for simultaneously holding and transporting both animal food and water for an animal. Yet another example of an animal food and water holding device is disclosed in U.S. Pat. No. 6,067,935 which provides for a portable animal watering container having a fluid reservoir having a resealable opening for accessing liquid and where the container is capable of carrying a volume of liquid. Additionally, the use of animal food and water holding devices within a cage for animals is well known in the prior art. U.S. Pat. No. 4,787,337 describes a pet water container which is capable of being hooked onto the side of the cage. Other examples of pet water cups exist, such as that offered by Kagewerks, Inc. of 9565 Pathway St., Santee, Calif. 92071 USA, in particular that known as the E-Z Crocks, crock with wedge configuration.

While these devices fulfill their respective, particular objectives, the need remains for an animal feeding and watering cup system that, among other objectives, is stackable for easy storage, securely connects to the animal's cage or crate to prevent spilling of the food and/or water, and prevents or deters an animal from gnawing on the system causing damage to the system.

For the reasons stated above, and for other reasons stated below which will become apparent to those skilled in the art upon reading and understanding the specification, there is a need in the art for an improved animal feeding and watering cup system.

Thus it is an object of at least one embodiment of the disclosure to provide an animal feeding and watering cup system that improves upon the state of the art.

Another object of at least one embodiment of the disclosure is to provide an animal feeding and watering cup system that is easy to use.

Yet another object of at least one embodiment of the disclosure is to provide an animal feeding and watering cup system that is efficient.

Another object of at least one embodiment of the disclosure is to provide an animal feeding and watering cup system that is cost effective.

Yet another object of at least one embodiment of the disclosure is to provide an animal feeding and watering cup system that is safe to use.

Another object of at least one embodiment of the disclosure is to provide an animal feeding and watering cup system that has a durable design.

Yet another object of at least one embodiment of the disclosure is to provide an animal feeding and watering cup system that has a long, useful life.

Another object of at least one embodiment of the disclosure is to provide an animal feeding and watering cup system that has a wide variety of uses.

Yet another object of at least one embodiment of the disclosure is to provide an animal feeding and watering cup system that has a wide variety of applications.

Another object of at least one embodiment of the disclosure is to provide an animal feeding and watering cup system that can be easily used by a user.

Yet another object of at least one embodiment of the disclosure is to provide an animal feeding and watering cup system that provides a cost savings to the user.

Another object of at least one embodiment of the disclosure is to provide an animal feeding and watering cup system that is relatively inexpensive.

Yet another object of at least one embodiment of the disclosure is to provide an animal feeding and watering cup system that provides value.

Another object of at least one embodiment of the disclosure is to provide an animal feeding and watering cup system that is aesthetically pleasing.

Yet another object of at least one embodiment of the disclosure is to provide an animal feeding and watering cup system that is stackable.

Another object of at least one embodiment of the disclosure is to provide an animal feeding and watering cup system that can be used for any type of animal.

Yet another object of at least one embodiment of the disclosure is to provide an animal feeding and watering cup system that can be used with any type of cage, crate or enclosure.

Another object of at least one embodiment of the disclosure is to provide an animal feeding and watering cup system that can be used with any type of cage or crate that is comprised of any size of bars.

Yet another object of at least one embodiment of the disclosure is to provide an animal feeding and watering cup system that can be easily removed from the cage, crate or enclosure.

These and other objects, features, or advantages of at least one embodiment will become apparent from the specification, figures and claims.

BRIEF SUMMARY OF THE DISCLOSURE

An animal feeding and watering cup system that can be used with any type of cage, crate or enclosure in order to provide food, water, medication or the like to an animal or an inhabitant of the cage, crate or enclosure. The system comprises a cup wherein a plurality of brackets is located on the outer surface of the cup, a connector, and a cage, crate, or enclosure. In one embodiment, the system comprises a cup which is connected to a cage via a plurality of brackets receiving a connector which securely attaches the cup to the cage. In one embodiment, the system comprises a cup which is easily stacked for easy storage and transportation.

BRIEF DESCRIPTION OF THE DRAWINGS

FIG. 3 is a rear elevation exploded view of the animal food and water cup system shown in FIG. 1;

FIG. 13 is a side perspective view of an alternative embodiment of a connector, the view showing the bottom end of the connector having a chamfered or angled surface that guides the lower end of the connector away from the cup when it engages horizontally extending bars of the cage upon insertion of the inserts of the connector into openings of the brackets of the cup.

DETAILED DESCRIPTION

Figure 1:
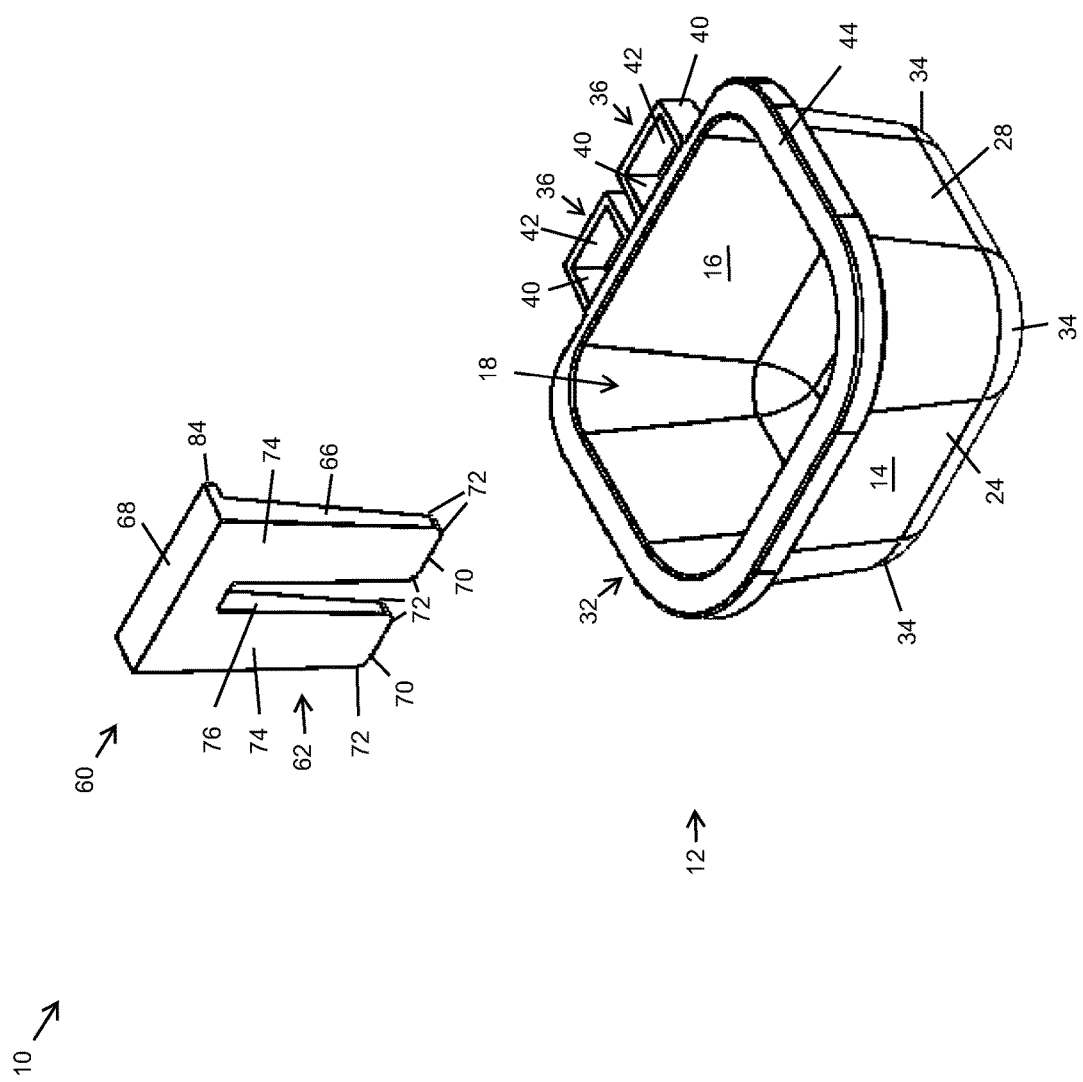
FIG. 1 is a front perspective exploded view of an animal food and water cup system, the view showing a cup and a connector exploded from one another, the view showing the cup having a collar; the view showing a plurality of brackets arranged symmetrically and attached to the back wall of cup; the view showing the connector having a pair of inserts that extend downward from a lip positioned at the top of the connector; the view showing the insert having a slot positioned between the pair of inserts.
Figure 2:
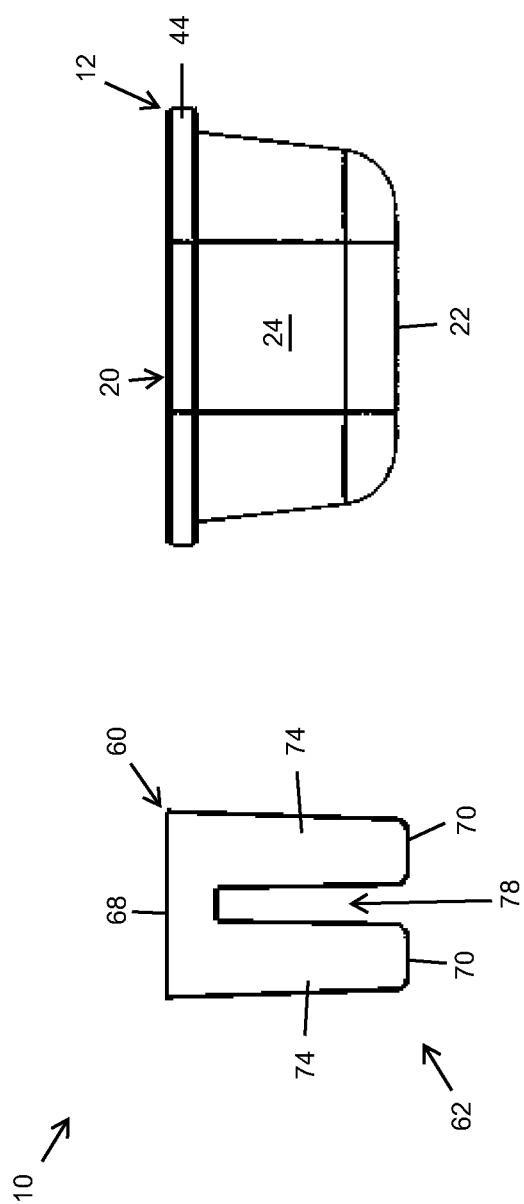
FIG. 2 is a front elevation exploded view of the animal food and water cup system shown in FIG. 1.
Figure 4:
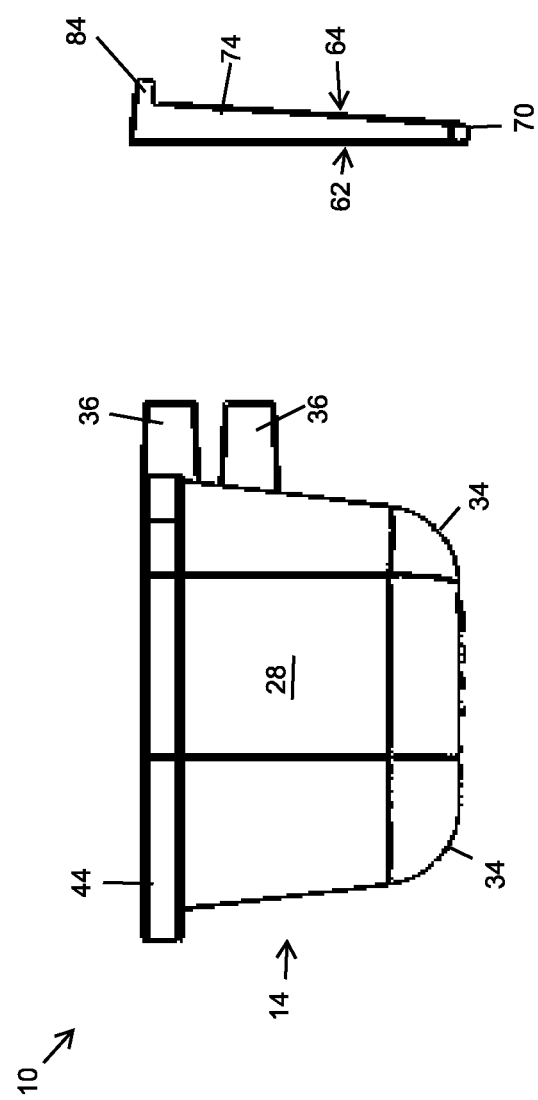
FIG. 4 is a left side elevation exploded view of the animal food and water cup system shown in FIG. 1.
Figure 5:
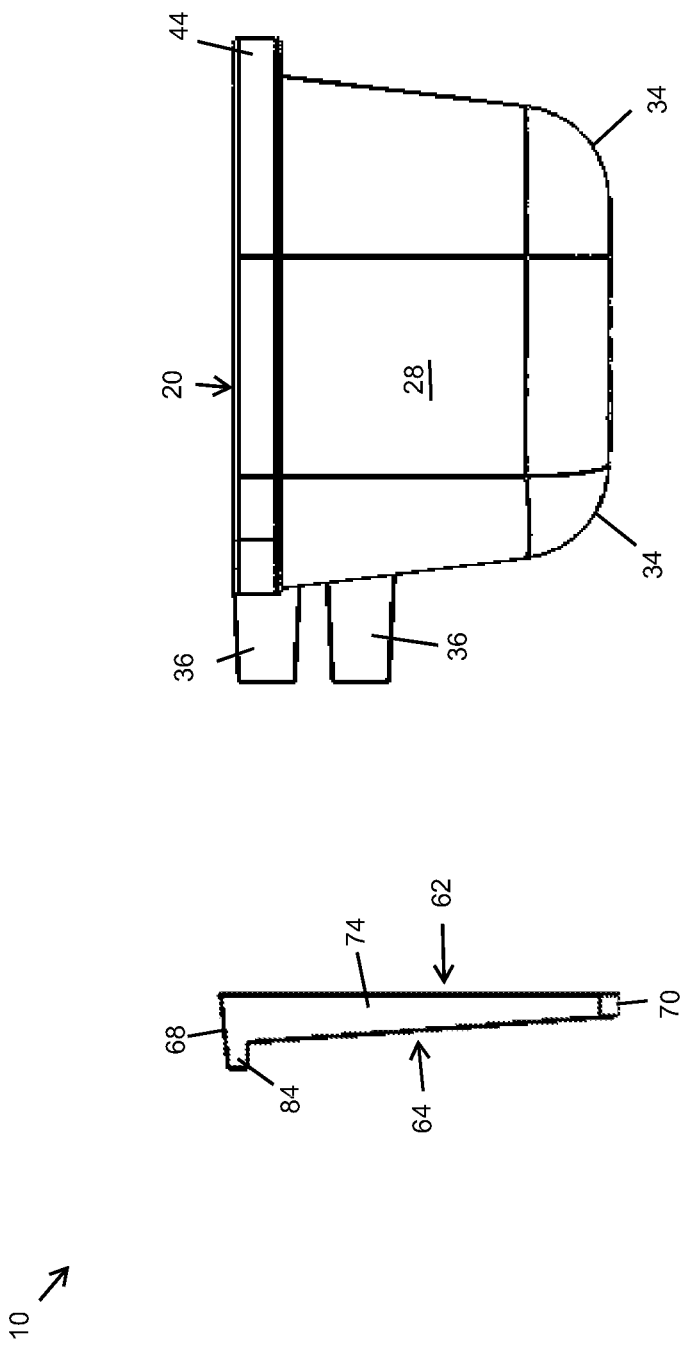
FIG. 5 is a right side elevation exploded view of the animal food and water cup system shown in FIG. 1.
Figure 6:
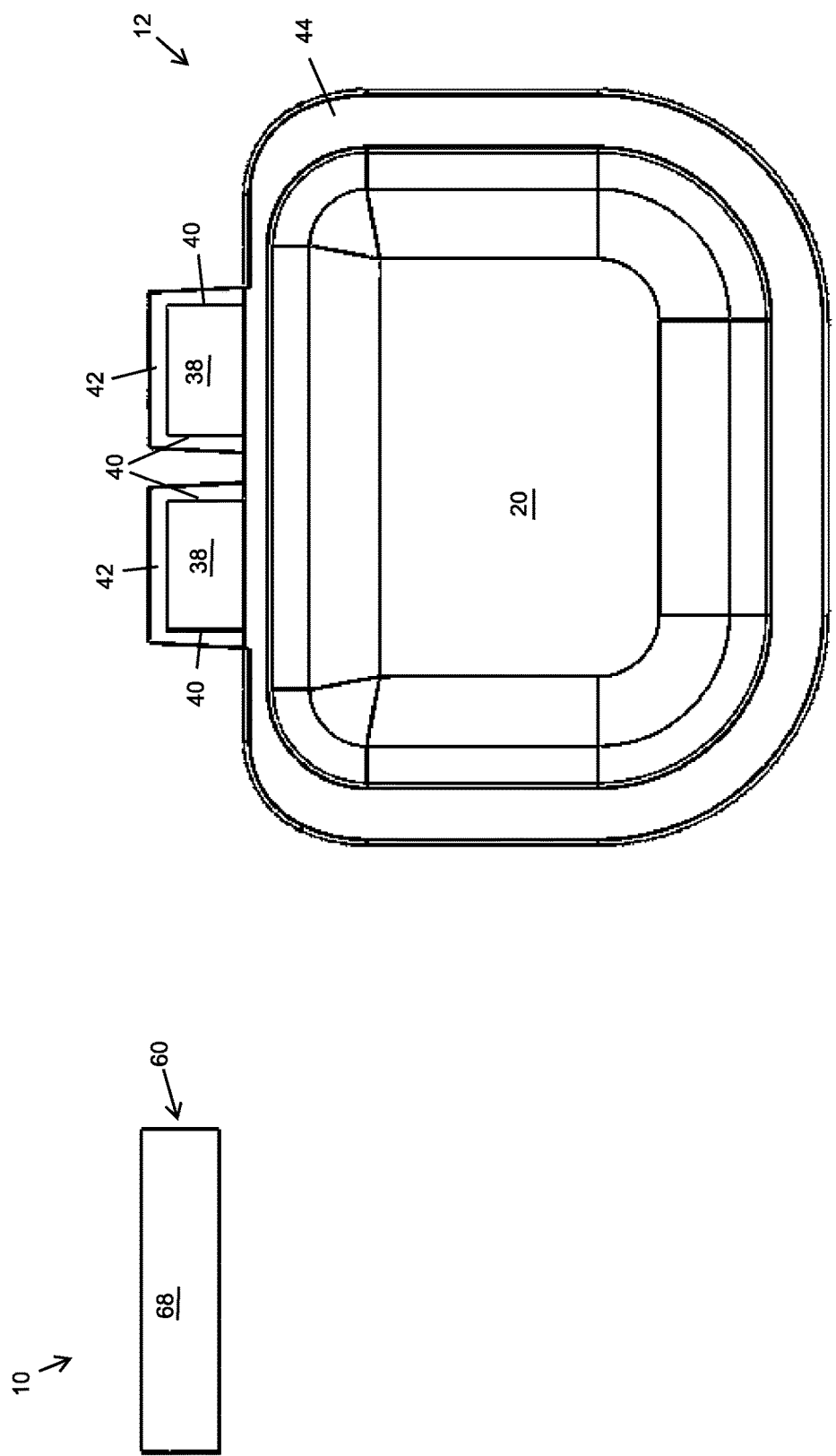
FIG. 6 is a top side elevation exploded view of the animal food and water cup system shown in FIG. 1.
Figure 7:
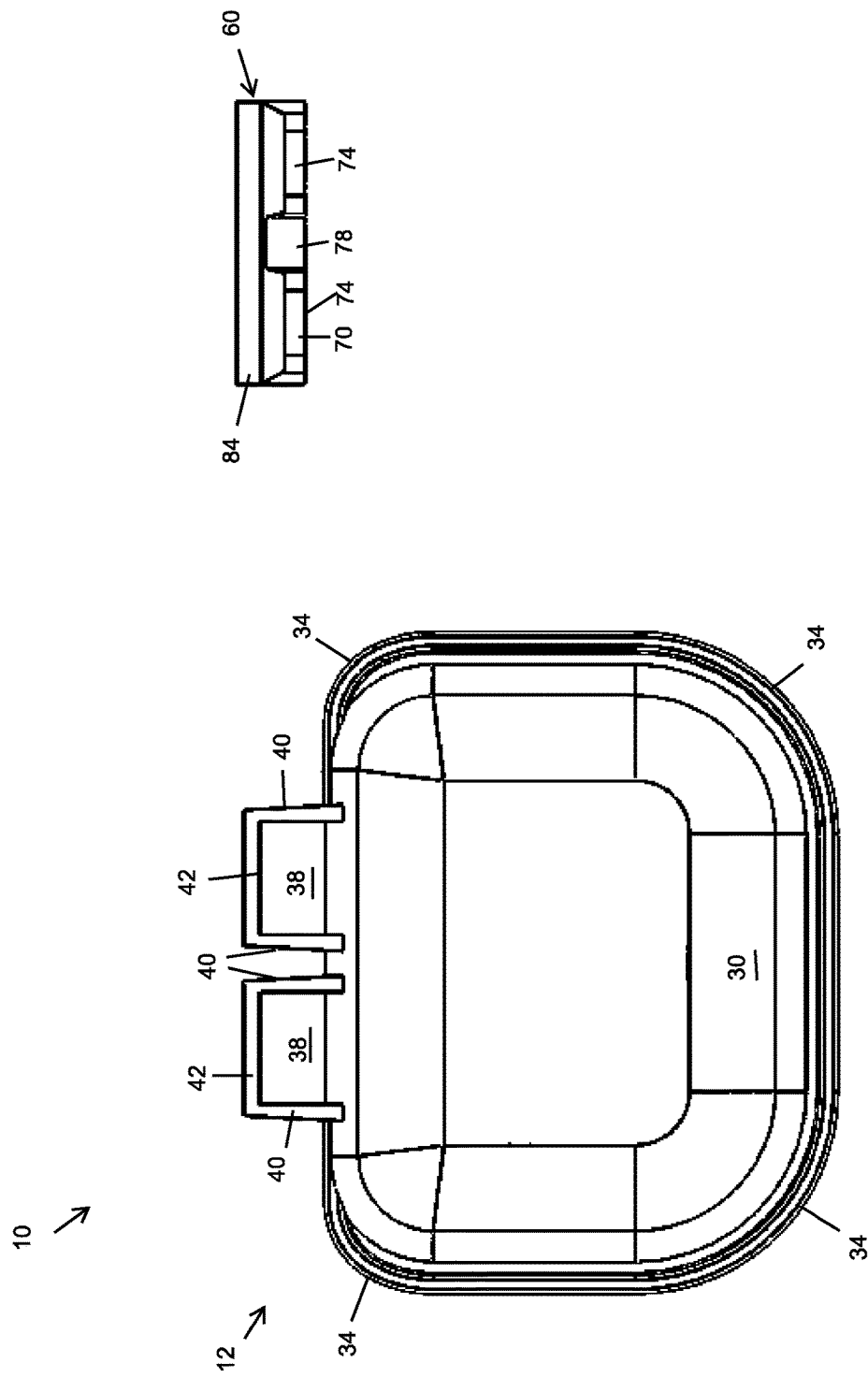
FIG. 7 is a bottom side elevation exploded view of the animal food and water cup system shown in FIG. 1.
Figure 8:
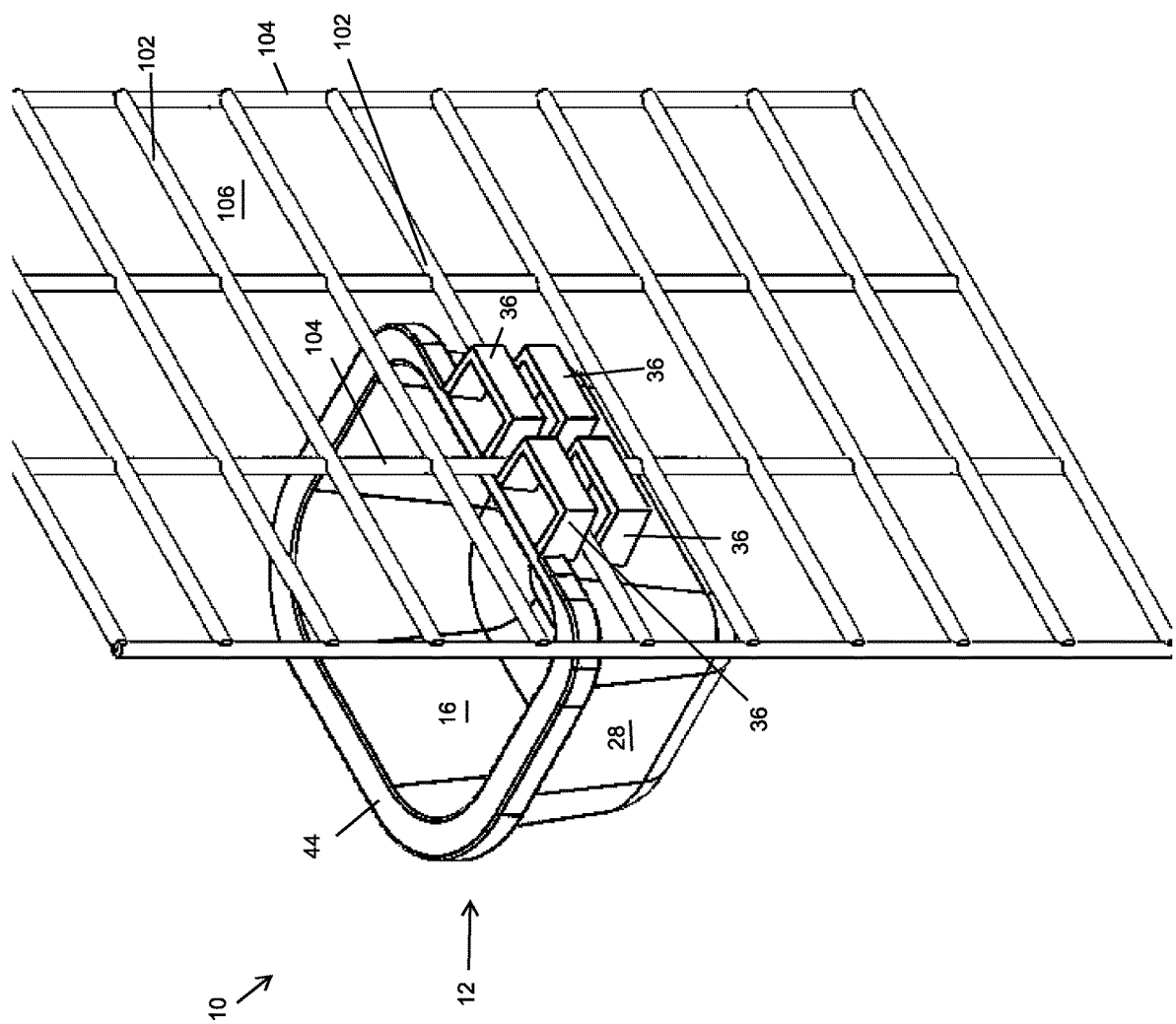
FIG. 8 is a rear perspective assembled view of an animal food and water cup system, the view showing a cup installed onto a cage, the view showing the four brackets positioned in spaced relation to one another on the back wall of the cup with a vertical bar of the cage extending vertically between the two vertically stacked pairs of brackets and a horizontal bar of the cage extending horizontally between the two laterally spaced pairs of brackets thereby indexing the cup to the bars of the cage so that it can be secured in place and not unintentionally moved; the view showing the connector not yet installed into the brackets.
Figure 9:
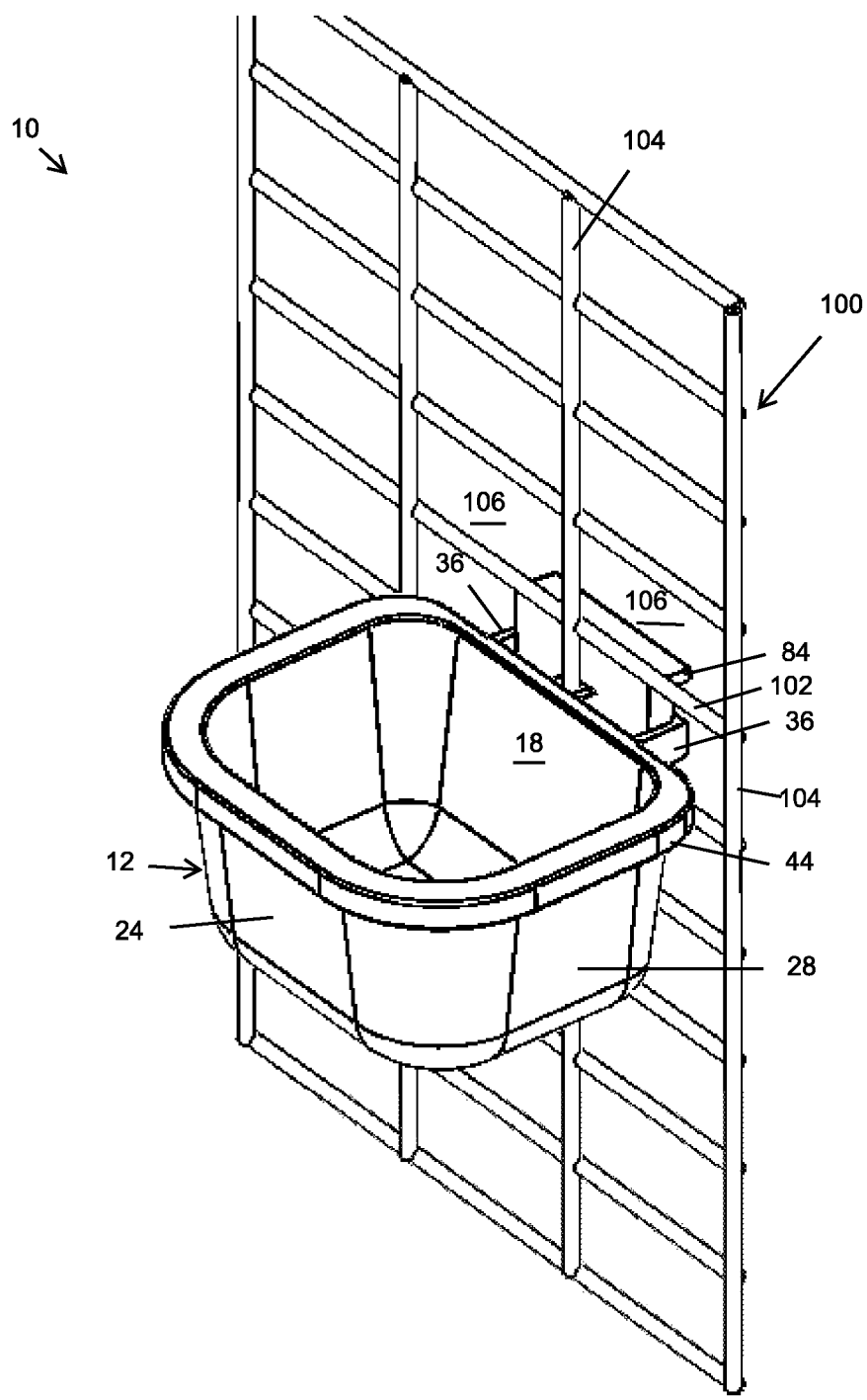
FIG. 9 is a front perspective assembled view of an animal food and water cup system, the view showing a cup installed onto a cage, the view showing the four brackets positioned in spaced relation to one another on the back wall of the cup with a vertical bar of the cage extending vertically between the two vertically stacked pairs of brackets and a horizontal bar of the cage extending horizontally between the two laterally spaced pairs of brackets thereby indexing the cup to the bars of the cage so that it can be secured in place and not unintentionally moved; the view showing the connector yet installed into the brackets on the rearward side of the cage with the inserts inserted within the openings of the brackets and the lip extending rearward away from the cup.

In the following detailed description of the embodiments, reference is made to the accompanying drawings which form a part hereof, and in which is shown by way of illustration specific preferred embodiments in which the disclosure may be practiced. These embodiments are described in sufficient detail to enable those skilled in the art to practice the disclosure, and it is to be understood that other embodiments may be utilized and that mechanical, procedural, and other changes may be made without departing from the spirit and scope of the present disclosures. The following detailed description is, therefore, not to be taken in a limiting sense, and the scope of the present disclosure is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

System:

An animal feeding and watering cup system 10 (or simply "system 10") is formed of any suitable size, shape, and design and is configured to facilitate quick, easy, reliable, and secure connection of the system 10 to a cage 100 to provide food, water, medication, among many other things, to animals or other inhabitants housed in a cage 100. In one arrangement, as is shown, an animal feeding and watering cup system 10 includes the component parts of a cup 12, having an outer surface 14, an inner surface 16, a hollow interior 18, a top end 20, a bottom end 22, a front wall 24, a back wall 26, opposing sidewalls 28, bottom wall 30, an upper edge 32, a plurality of corner sections 34, a plurality of brackets 36, and a collar 44, among other components; a connector 60, having a front side 62, a rear side 64, an exterior edge 66, a top end 68, a bottom end 70, a plurality of bottom corners 72, a pair of inserts 74, a slot 78 between the pair of inserts 74, an upper end 80 of the slot 78, a bottom end 82 of the slot 78, and a lip 84, among other components; and a cage 100, having a plurality of horizontal bars 102, a plurality of vertical bars 104, and a plurality of openings 106, among other components. The system 10 includes component parts in addition to those provided above that work in concert with one another to facilitate quick, easy, and secure connection of the system 10 to a cage 100 as provided in detail herein.

Cup:

In the arrangement shown, as one example, system 10 includes a cup 12. Cup 12 is formed of any suitable size, shape, and design and is configured to hold food, water, medication, among many other things, and to securely attach or connect to a cage 100 or other type of enclosure of any suitable size, shape, and design. Connection of cup 12 to a cage 100, wherein an animal or other living inhabitant is housed, provides for the animal to easily consume the material provided in the cup 12. In one arrangement, as is shown, cup 12 is comprised of an outer surface 14, an inner surface 16, a hollow interior 18, a top end 20, a bottom end 22, a front wall 24, a back wall 26, opposing sidewalls 28, a bottom wall 30, an upper edge 32, a plurality of corner sections 34, a plurality of brackets 36, and a collar 44.

In one arrangement, as is shown, front wall 24, back wall 26, opposing sidewalls 28, and bottom wall 30 of cup 12 are formed of any suitable size, shape, and design and are configured to work in concert with one another to contain food, water, medication, among other materials, without leaking or losing any of the material as described herein. In the arrangement shown, as one example, front wall 24, back wall 26, and opposing sidewalls 28 are generally flat and planar exterior walls which, when put together, along with bottom wall 30, comprise the structure of the cup 12. In one arrangement, as is shown, bottom wall 30 is generally flat and planar. Additionally, in one arrangement, as is shown, front wall 24, back wall 26, and opposing sidewalls 28, are slightly angled towards one another as they extend downward and connect to bottom wall 30 to form cup 12. This slight inward angling of front wall 24, back wall 26 and sidewalls 28 facilitates nesting and stacking of a plurality of cups 12 to save space and ease transport of a plurality of cups 12. In one arrangement, as is shown, front wall 24 is connected to opposing sidewalls 28 at its outer edges and back wall 26 is connected to opposing sidewalls 28 at its outer edges wherein front wall 24 and back wall 26 are opposite one another and opposing sidewalls 28 are opposite one another. Additionally, the bottom wall 30 is located beneath front wall 24, back wall 26 and opposing sidewalls 28 and connects to the bottom edge of these walls 24, 26, 28. In one arrangement, as is shown, the connection of front wall 24 to an opposing sidewall 28 and bottom wall 30 forms a corner section 34. Additionally, the connection of back wall 26 to an opposing sidewall 28 and bottom wall 30 forms a corner section 34.

In the arrangement shown, as one example, corner sections 34 are formed of any suitable size, shape, and design and are configured to work in concert with the other components of the animal feeding and watering cup system 10 to contain food, water, medication, among other materials, without leaking or losing any of the material as described herein. In one arrangement, as one example, corner sections 34 are rounded in shape to provide ease of stacking two or more cups 12 for easy storage or to easily transport two or more cups 12 from one location to another. Also by being rounded this prevents the animal from chewing on the corner sections 34 and also prevents the cup 12 from catching on other objects and also prevents injury to the animal housed within the cage 100.

In one arrangement, as is shown, a plurality of brackets 36 are located on back wall 26 of cup 12. Plurality of brackets 36 is formed of any suitable size, shape, and design and are configured to receive a connector 60 to provide a secure and reliable connection to a cage, crate, or enclosure 100 which houses an animal or other living inhabitant. In one arrangement, as is shown, when viewed from above, brackets 36 have a generally square or rectangular periphery that form a generally square or rectangular shaped opening 38 positioned at the middle of brackets 36. In the arrangement shown, brackets 36 include a back wall 42 that extends laterally across the back wall 26 of cup 12 a distance before connecting to sidewalls 40 that extend forward before connecting to back wall 26 of cup 12. In this way, brackets 36 form a generally square or rectangular member connected to back wall 26 and form a generally square or rectangular opening 38 that is sized and shaped to receive connector 60 therein. In one arrangement, as is shown, a plurality of brackets 36 is located near the top end 20 of back wall 26 of cup 12 such that the weight of the cup 12 hangs down from the brackets 36 when they are connected to cage 100. However, other locations of the plurality of brackets 36 including, but not limited to, in the middle of back wall 26, bottom end 22 of back wall 26, evenly dispersed across the back wall 26, or any other position are contemplated by the disclosure.

In one arrangement, as is shown, each bracket 36 is vertically and/or horizontally aligned with other brackets 36 to receive a horizontal bar 102 and/or a vertical bar 104 of a cage 100 between adjacent brackets 36 which allows for secure and reliable connection of cup 12 to cage 100. In one arrangement, as one example, each bracket 36 is horizontally aligned with other brackets 36 to receive a vertical bar 104 of a cage 100 between laterally adjacent brackets 36 which allows for secure and reliable connection of cup 12 to cage 100. In one arrangement, as one example, each bracket 36 is vertically aligned with other brackets 36 to receive a horizontal bar 102 of a cage 100 between vertically adjacent brackets 36 which allows for secure and reliable connection of cup 12 to cage 100. In one arrangement, as is shown, two pairs of vertically aligned brackets 36 are positioned laterally adjacent to one another with a vertical space extending between the adjacent pairs of vertically stacked brackets 36. Additionally, the vertically aligned brackets 36 are positioned vertically adjacent to one another with a lateral space between the vertically adjacent brackets 36.

In the arrangement shown, as one example, two brackets 36 are positioned laterally adjacent to one another, with a space positioned between them, and two brackets 36 are stacked vertically adjacent to one another, with a space positioned between them. This arrangement of four adjacent, yet spaced apart, brackets 36 facilitates a strong and secure connection to cage 100 and allows one horizontal bar 102 to extend between the vertically stacked brackets 36 and one vertical bar 104 to extend between the laterally positioned brackets 36. Using four brackets 36 allows use of system 10 on any cage 100 where the thickness of the wire is less than the space between adjacent brackets 36. With that said, any other number of brackets 36 is hereby contemplated, such as one, three, four, five, six or more stacked laterally and/or vertically.

In one arrangement, as is shown, cup 12 is comprised of a front wall 24, a back wall 26, opposing sidewalls 28, and a bottom wall 30, which form a hollow interior 18, or otherwise known as a cup reservoir. Hollow interior 18 is formed of any suitable size, shape, and design and is configured to receive food, water, medication, treats or the like in order for an animal or any inhabitant housed within a cage, crate, or enclosure 100 to consume the material contained within the hollow interior 18.

In one arrangement, the width of the vertical space between laterally adjacent brackets 36 and the width of the horizontal space between vertically adjacent brackets 36 narrows slightly as it extends from back wall 42 of brackets 36 to the back wall 26 of cup 12. That is, when viewed from above or below, the opposing inward facing surfaces of sidewalls 40 of laterally adjacent brackets 36 angle slightly toward one another as they extend from back wall 42 of bracket 36 to back wall 26 of cup 12. Similarly, when viewed from the side, the opposing top and bottom facing surfaces of sidewalls 40 of vertically adjacent brackets 36 angle slightly toward one another as they extend from back wall 42 of bracket 36 to back wall 26 of cup 12. This slight narrowing of these spaces between brackets 36 allows for a tighter connection between cup 12 and cage 100 as the horizontal bars 102 and vertical bars 104 may be cinched or locked within the narrowing space. That is, as the connector 60 is inserted further and further into the brackets 36, the narrowing of the spaces between adjacent brackets 36 has a snugging or cinching effect on the horizontal bars 102 and vertical bars 104 of cage 100 thereby providing a stronger connection between cup 12 and cage 100. The harder connector 60 is inserted into brackets 36 the tighter the engagement between horizontal bars 102 and vertical bars 104 of cage 100 and brackets 36.

In one arrangement, as is shown, the opening 38 of each bracket 36 is generally square or rectangular in shape when viewed from above or below. In the arrangement shown, as one example, the openings 38 of vertically stacked brackets 36 align with one another so that inserts 74 may be inserted within the vertically aligned openings of the vertically aligned brackets 36.

Collar:

In one arrangement, as is shown, a collar 44 surrounds the perimeter of the top end 20 of cup 12. Collar 44 is formed of any suitable size, shape, and design and is configured to prevent an animal which is housed in a cage, crate, or enclosure 100 from chewing, gnawing, or causing damage to cup 12. In one arrangement, as is shown, collar 44 is flush with the inner surface 16 of the cup 12 and protrudes outwardly from the outer surface 14 of the cup 12 forming a lip around the upper edge 32 of the cup 12 making it extremely difficult for an animal to chew or latch onto cup 12 and cause damage or harm which then may result in leaking or spilling of the material contained within the hollow interior 18 or cause harm to the animal if cup 12 is damaged and a portion of the cup 12 is digested by the animal. In the arrangement shown, this is accomplished by collar 44 being generally thick in nature or sufficiently thick in nature, that is, collar 44 is many times taller and many times wider than the general thickness of the material that forms front wall 24, back wall 26 and sidewalls 28. This increased thickness makes it difficult for the animal to get their mouth around the collar 44 to chew on the collar 44. This increased thickness also provides system 10 with added durability and ruggedness, that is, the animal can chew on the collar 44 for a substantial amount of time before chewing through the collar 44 and affecting the ability for system 10 to hold food or water.

In one arrangement, collar 44 is two times, three times, four times, five times, six times, seven times, eight times, nine times, ten times, or more times the thickness of walls 24, 26 28. This adds to material cost, but extends the life, longevity, durability and usability of the cup 12. In the arrangement shown, as one example, when viewed from the side, collar 44 is generally square or rectangular in shape with rounded edges and when viewed from above with rounded corners at the intersection of sidewalls 28 and back wall 26 and front wall 24. In an alternative arrangement, collar 44 is generally circular or oval in shape when viewed from the side. Any other shape is hereby contemplated for use.

Connector:

In one arrangement, as is shown, the animal feeding and watering cup system 10 comprises a connector 60. Connector 60 is formed of any suitable size, shape, and design and is configured to be inserted within a plurality of brackets 36 thereby holding cup 12 to cage 100. In one arrangement, as is shown, connector 60 is comprised of a front side 62, a rear side 64, an exterior edge 66, a top end 68, a bottom end 70, a plurality of bottom corners 72, a pair of inserts 74, a slot 78 between pair of inserts 74, and a lip 84, among other components.

Each insert 74 is formed of any suitable size, shape, and design and is configured to be inserted within the opening 38 of a plurality of vertically stacked brackets 36 in order to securely attach cup 12 to a cage 100. In one arrangement, as is shown, each insert 74 laterally extends from the exterior edge 66 to the interior edge 76. In one arrangement, as is shown, each insert 74 extends vertically from an upper end to a lower end. In one arrangement, each insert 74 narrows as the insert 74 extends from the upper end to the lower end. Said another way, the slot 78 between adjacent inserts 74 is narrower at its top end as compared to its bottom end. This narrowing of the width of the slot 78 facilitates the inward facing edges of inserts 74 to cinch or lock onto the inward edges of openings 38 of brackets 40 thereby locking connector 60 to cup 12. In one arrangement, as is shown, each insert 74 is a wedge shape, or slightly wedge shaped, when viewed from the front, back and sides.

In one arrangement, as is shown, ads one example, the forward side of the bottom end 70 (opposite the side of connector 60 that includes lip 84) is an angled, rounded and/or chamfered surface 71. The chamfered surface 71 is arranged such that the front side 62 is shorter in length from the top end 68 to the bottom end 70 than the rear side 64. Said another way, this chamfered surface 71 angles from the forward side to the rearward side as it extends downward. The chamfered edge 71 forms a smooth surface along the bottom end 70 which facilitates easy insertion of the connector 60. In this way, when the bottom end 70 of inserts 74 engage a horizontally extending bar 102 of cage 100 the chamfered surface 71 guides the bottom end 82 of inserts 74 away from the interior of the cage 100 and away from the cup 12, thereby preventing the inserts 74 from extending through the openings 106 in the cage 100. This eases installation.

In one arrangement, as is shown, connector 60 comprises a pair of inserts 74 wherein a slot 78 is positioned between the pair of inserts 74 in order to allow the pair of inserts 74 to enter into the appropriate plurality of brackets 36 in order to securely and reliably attach cup 12 to cage 100 which will prevent an animal housed within cage 100 from spilling the contents of cup 12. In one arrangement, as is shown, connector 60 comprises a lip 84 which steps out from top end 68 of the rear side 64 of connector 60. Additionally, using a pair of inserts 74 allows for a strong and durable connection of cup 12 to cage 100. With that said, any other number of inserts 74 is hereby contemplated, such as one, three, four, five, six, or more.

Slot:

Slot 78 is formed of any suitable size, shape, and design in order to easily and accurately enable the pair of inserts 74 to be easily inserted into a plurality of brackets 36 in order to securely and reliably attach cup 12 to cage 100 which prevents an animal or other inhabitant of cage 100 from spilling the contents of cup 12. In one arrangement, as is shown, the interior edges 76 of inserts 74 are angled away from one another slightly as they extend from top end 68 to bottom end 70. This allows each insert 74 to be easily inserted into brackets 36, as the lower end of inserts 74 are positioned at a slightly greater distance from one another than at the upper end of inserts 74 and the bottom end 82 of inserts 74 are smaller than the upper end of inserts 74. Another benefit of the slot 78 between opposing inserts 74 narrowing as it extends upwards is that as the connector 60 is inserted further into the openings 38 of brackets 36, the opposing interior edges 76 of inserts 74 have an increasing frictional engagement with brackets 36, thereby helping to hold and frictionally lock connector 60 in place on cup 12.

Lip:

In one arrangement, as is shown, an animal feeding and watering cup system 10 comprises a connector 60. Connector 60 is formed of any suitable size, shape, and design and is configured to be inserted within plurality of brackets 36. In one arrangement, as is shown, connector 60 comprises a lip 84, among other components. In one arrangement, as is shown, lip 84 protrudes from top end 68 of connector 60 in a rearward direction. Lip 84 is formed of any suitable size, shape, and design and is configured to prevent or discourage an animal or other inhabitant of a cage 100 from chewing or gnawing on the system 10 in order to prevent damage to system 10 resulting in leaking, spilling, and loss of material contained within hollow interior 18 of cup 12. In addition, the increased surface area of rearwardly extending lip 84 makes it easier for a user to insert and remove connector 60 from brackets 36, and allows a user to apply greater force to connector 60 to provide a firmer hold on cup 12 and to remove connector 60 when it is in tight engagement with cup 12.

Cage:

In one arrangement, as is shown, an animal feeding and watering cup system 10 is connected to a cage, a crate, or other type of enclosure 100. Cage 100 is formed of any suitable size, shape and design and is configured to receive an animal feeding and watering cup system 10. In one arrangement, as one example, cage 100 is comprised of a plurality of horizontal bars 102, a plurality of vertical bars 104, and a plurality of openings 106, among other components.

In one arrangement, as is shown, cage 100 is formed of a plurality of vertical bars 104 and a plurality of horizontal bars 102 which are formed of metal, wire, mesh, or the like. Plurality of horizontal bars 102 and plurality of vertical bars 104 are formed of any suitable size, shape, and design. In one arrangement, as is shown, plurality of horizontal bars 102 intersect with a plurality of vertical bars 104 forming a plurality of square or rectangular openings 106. In one arrangement, as is shown, cup 12 is attached to cage 100 wherein plurality of brackets 36 extends through a plurality of openings 106 of cage 100 and plurality of brackets 36 receive connector 60 in order to securely connect cup 12 to cage 100. In many instances, cage 100 also comprises a top, a bottom, a front wall, a back wall, and opposing sidewalls. Cup 12 may be attached to any wall of cage 100 without departing from the disclosure.

In Operation:

In one arrangement, as is shown, cup 12 is attached to cage 100 by placing horizontally extending bar 102 in the space between the two pairs of vertically stacked brackets 36 and by placing a vertically extending bar 104 in the space between the two pairs of the laterally positioned brackets 36. Once in this position, the brackets 36 are inserted through openings 106 of cage 100. Once in this position, the plurality of brackets 36 receive connector 60 in order to securely connect cup 12 to cage 100. More specifically, in this position, while the majority of the cup 12 is positioned within the cage 100, the rearward wall 26 and at least a portion of the opening 38 of brackets 36 extend through openings 106 of cage 100 and are positioned outside of the cage 100 and on the opposite side of the bars 102/104 as is the other portions of cup 12. In this position, with the lip 84 of connector 60 extending away from the cage 100, the lower end of inserts 74 of connector 60 are inserted into the openings 38 of brackets 36. The further the connector 60 is inserted into the brackets 36, because the inserts 74 are thinner toward their lower end and increase in thickness as they extend upward, the angled or wedge shaped inserts 74 will bind against horizontal bar 102 positioned between the pairs of vertically stacked brackets 36. Once engagement occurs between the inserts 74 and the horizontal bar 102 between the pairs of vertically stacked brackets 36 the user applies the desired amount of pressure to the top end 68 of connector 60 thereby locking connector 60 in place within brackets 36. The extended surface area provided by the rearward extension of lip 84 facilitates the easy application of the desired amount of force by the user.

When connector 60 is in place within openings 38 of the pairs of vertically stacked brackets 36, a frictional force is generated between the exterior surface of inserts 74 and the rearward surface of the horizontal bar 102 that extends between the pairs of vertically stacked brackets 36. When connector 60 is in place within openings 38 of the pairs of vertically stacked brackets 36, a frictional force is generated between the exterior surface of inserts 74 and the inward surface of the back wall 42 of bracket 36. These frictional forces help to hold cup 12 in rigid connection with cage 100 and prevent an animal within the cage 100 from easily dislodging the cup from the cage 100.

Figure 10:
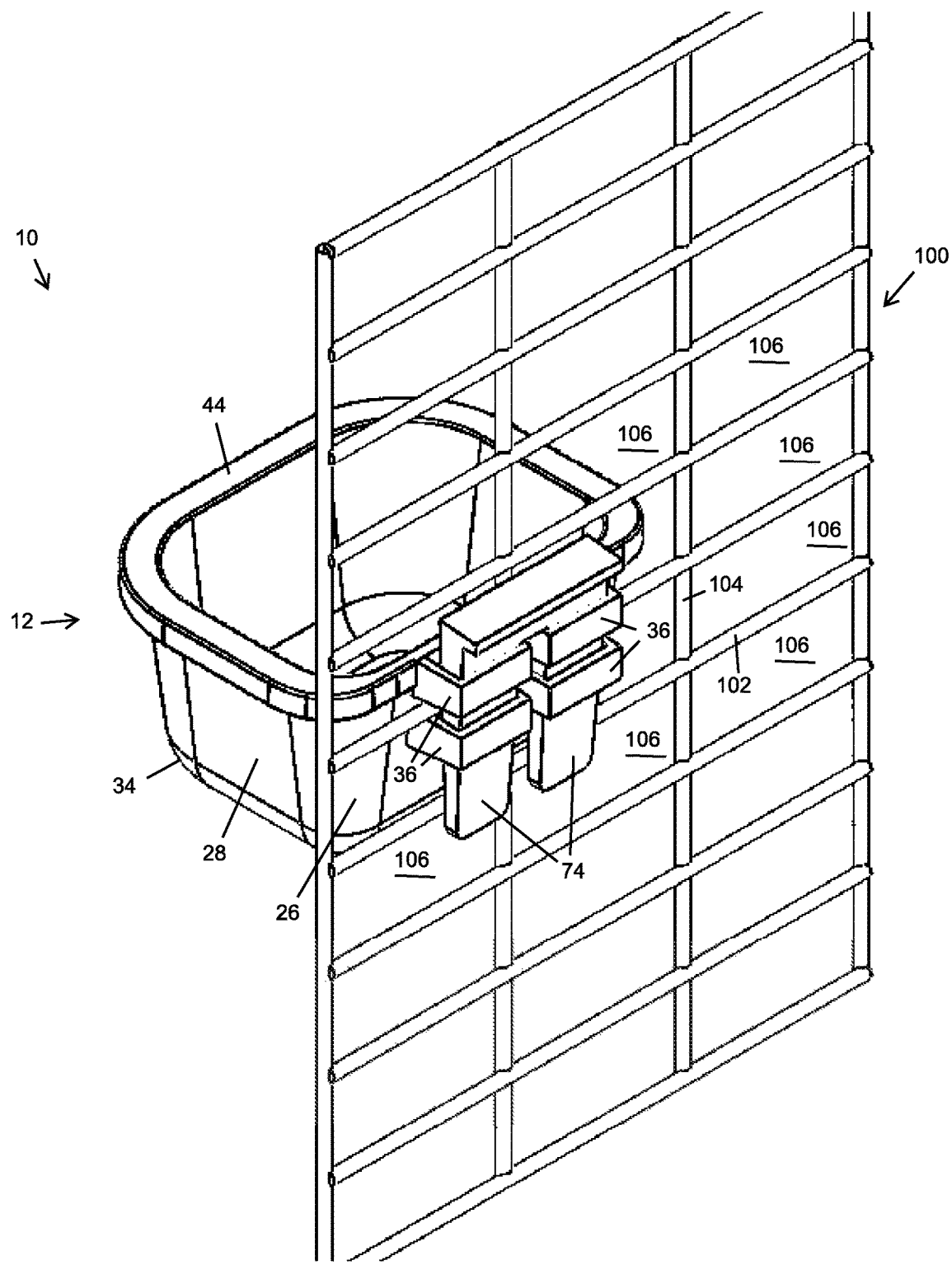
FIG. 10 is a rear perspective view of the view shown in FIG. 9.
Figure 11:
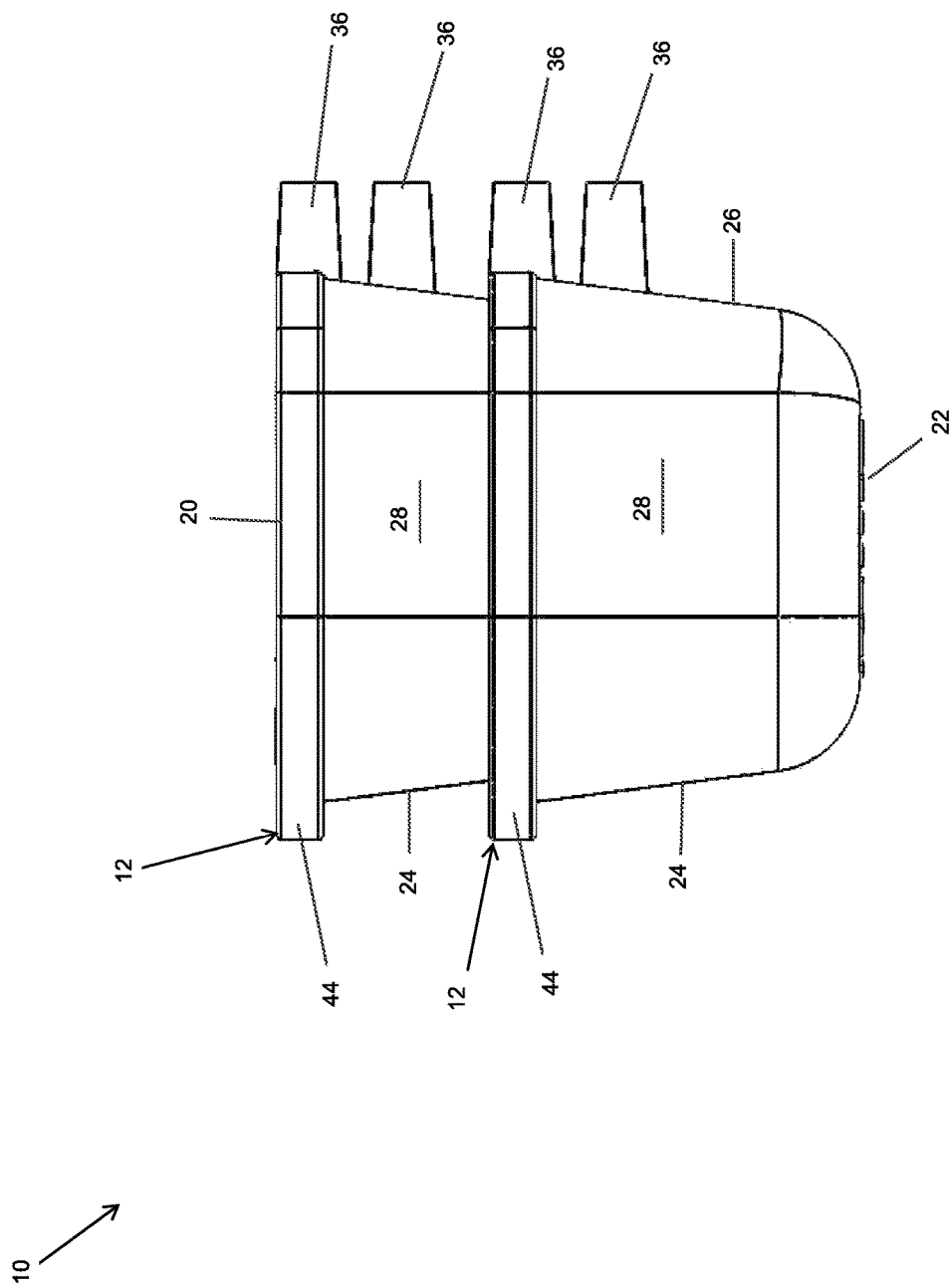
FIG. 11 is a side elevation view of an animal food and water cup system, the view showing a pair of cups nested within one another in a stacked formation where the two cups are frictionally connected to one another and held in place thereby saving space and thereby allowing for easier transportation of a plurality of cups.
Figure 12:
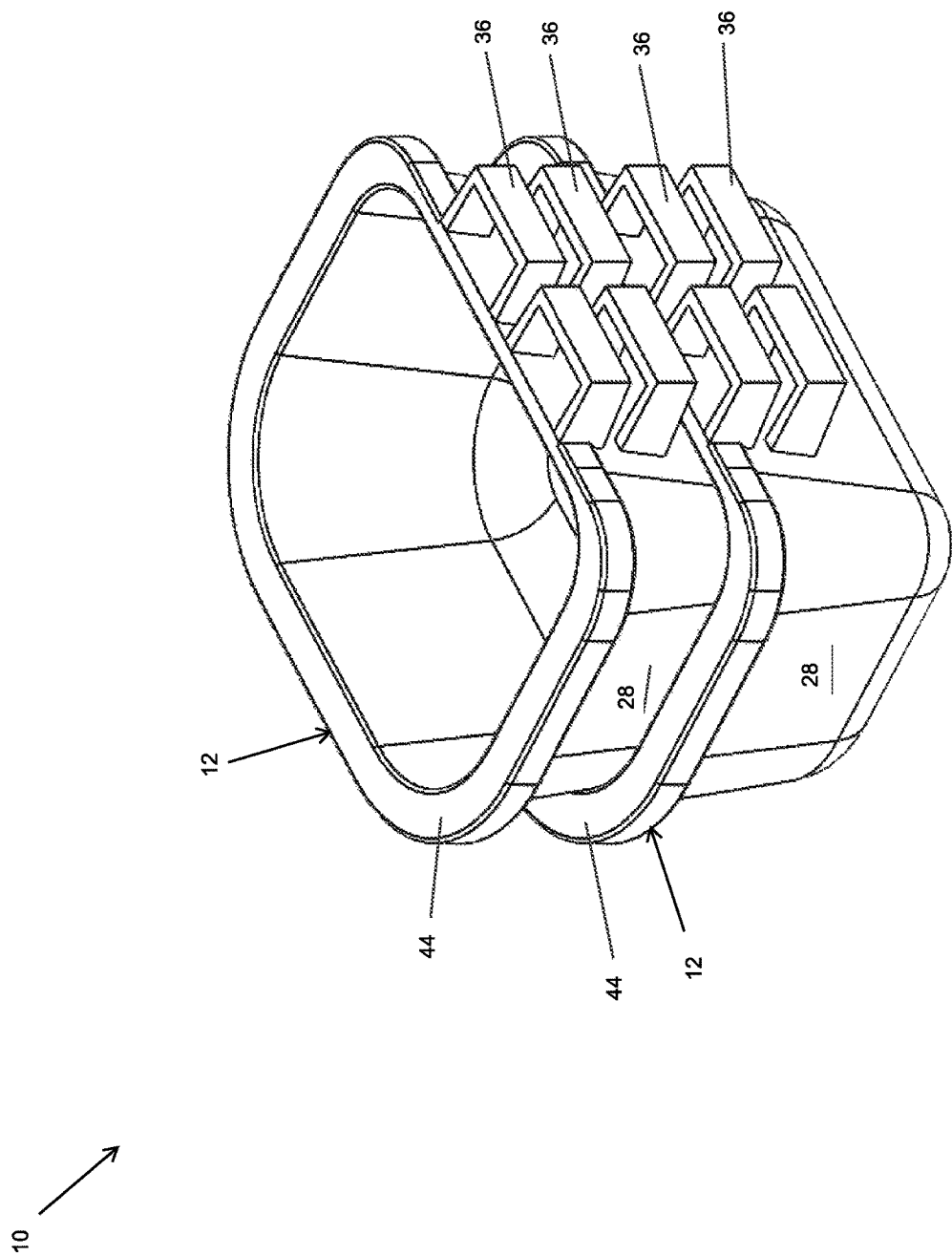
FIG. 12 is a perspective view of the view shown in FIG. 11.

In addition, in this position, due to the extended vertical height of brackets 36, when connector 60 is in position within the openings 38 of vertically stacked brackets 36 the horizontal bar 102 that extends between the two pairs of vertically stacked brackets 36 is sandwiched between two extended planes, the plane formed by the back wall 26 of cup 12 and the plane formed by the forward facing surface 62 of connector 60, that are essentially locked together. This extended locked plane of engagement arrangement, prevents the cup 12 from easily being tipped and dislodged by an animal within cage 100. That is, due to this extended plane of engagement, which extends across a plurality of horizontally extending bars 102, prevents the cup 12 from being tilted upward, such as an animal pushing upward on the bottom wall 30 of the cup 12, thereby preventing the cup 12 from being spilled or flipped by the animal. In addition, in some arrangements, as is shown in FIG. 10, when connector 60 is inserted with in the plurality of brackets 36, the lower end of inserts 74 reaches so far down that it actually crosses the next horizontal bar 102. This extends the length of the plane of locked engagement between the back wall 26 of cup 12 and the front side 62 of connector 60 even further. When the lower end of connector 60 crosses two horizontal bars 102, in the manner shown in FIG. 10, there is essentially no way the cup 12 can be tipped upward by an animal within cage 100.

The wedge shaped inserts 74 of connector 60 allow the system 10 to tightly attach to cage 100 and accommodate practically any cage 100. With that said, the system 10 is capable of tightly and securely attaching to a cage 100 comprising bars 102/104 of any circumference and/or shape.

In one arrangement, as one example, connector 60 is removed from plurality of brackets 36 and cup 12 by pulling upward on connector 60 by applying an upward pressure on lip 84. When sufficient force is applied upward to overcome the frictional engagement between horizontal bar 102 of cage 100 and the front side 62 of connector 60, and frictional engagement between the rear side 64 of connector 60 and the inward surface of the back walls 42 of brackets 36, then the connector 60 is moved upward within the openings 38 of brackets 36. Because the inserts 74 of connector 60 narrow as they extend downward, the friction between connector 60 and cup 12 and cage 100 reduces substantially as the connector 60 moves upward. Once connector 60 is removed from brackets 36, cup 12 can be easily removed from cage 100 by moving the cup 12 away from the bars 102/104 between brackets 36 thereby pulling brackets 36 back through openings 106 in cage 100 at which point the cup 12 is free and clear from cage 100.

For storage and transportation, due to the inward angling of the walls 24, 26, 28, a plurality of cups 12 may be stacked in one another and frictionally locked together such that they have a tendency to remain connected as opposed to becoming separated from one another. That is, as the cups 12 are nested within one another and force is applied the cups 12 lock onto one another thereby holding themselves together during transportation and storage. When individual cups 12 are needed, force is applied to separate adjacent cups 12, thereby making the cups 12 readily available individually, while easily transported in bulk.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the disclosure. It is intended that this disclosure be limited only by the following claims, and the full scope of equivalents thereof.

From the above discussion, it will be appreciated that the animal feeding and watering cup presented that improves upon the state of the art. That is, the animal feeding and watering cup presented: improves upon the state of the art; is easy to use; is efficient; is cost effective; is safe to use; has a durable design; has a long, useful life; has a wide variety of uses; has a wide variety of applications; can be easily used by a user; provides a cost savings to the user; is relatively inexpensive; provides value; is aesthetically pleasing; is stackable; can be used for any type of animal; can be used with any type of cage, crate or enclosure; can be used with any type of cage or crate that is comprised of any size of bars; can be easily removed from the cage, crate or enclosure, among countless other features, aspects, improvements and objectives.

The invention claimed is:

1. An animal feeding and watering cup system, comprising:
    a cup having an upper edge, a front wall, a back wall, opposing sidewalls, and a bottom wall; the cup forming a hollow interior configured to receive and hold water, food or other material;
    an animal cage formed of a plurality of bars;
    a plurality of brackets positioned on the back wall of the cup;
    the plurality of brackets including a first pair of brackets and a second pair of brackets;
    wherein the first pair of brackets are vertically aligned;
    wherein the second pair of brackets are vertically aligned;
    wherein the first pair of brackets are horizontally aligned with the second pair of brackets;
    wherein each bracket of the plurality of brackets has a pair of sidewalls and a back wall creating a completely closed periphery when positioned on the back wall of the cup;
    the plurality of brackets are configured to receive a horizontal bar of the cage in a lateral spacing between the plurality of brackets and a vertical bar of the cage in a vertical spacing between the plurality of brackets;
    wherein each of the plurality of brackets has an opening configured to receive an insert of a connector;
    a connector having a lip at an upper end and pair of inserts separated by a single slot that extends downward vertically from the upper end to a lower end;
    wherein when a bar of a cage is positioned between two adjacent brackets of the plurality of brackets and the pair of inserts of the connector are inserted within the openings of the plurality of brackets, the cup is frictionally held in place on the cage and the closed periphery of each bracket surrounds the insert of the pair of inserts that is inserted in the opening of the bracket; and
    wherein each opposing first pair of brackets and second pair of brackets angle toward one another as they extend from the back wall of the bracket to the back wall of the cup, creating a snug fit with horizontal and vertical cage bars.

2. The animal feeding and watering cup system of claim 1, wherein the cup further comprises:
    a collar;
    wherein the collar forms a lip around the upper edge of the cup; and
    wherein the collar is taller and wider than a thickness of the front wall, the back wall, or the sidewalls of the cup.

3. The animal feeding and watering cup system of claim 1, wherein a forward side of the lower end of the inserts of the connector angles away from the cup to ease insertion into the brackets of the cup; and
    wherein the connector has a consistent taper extending from a upper end of the connector to the forward side of the lower end of the connector, thereby permitting the connector to be positioned in the openings of the brackets with an infinite number of distances between the back wall of the cup to facilitate tight clamping bars of multiple different thicknesses between the bracket and the back side of the cup.

4. The animal feeding and watering cup system of claim 1, wherein a rear side of the upper end of the connector includes a lip that extends outward and away from the cup; and
    wherein only the pair of inserts extend downward below the lip of the connector.

5. The animal feeding and watering cup of claim 1, wherein the bars of the animal cage are formed of metal, wire or mesh.

6. The animal feeding and watering cup system of claim 1, wherein when a horizontal bar of a cage is positioned between the vertically aligned brackets of each pair of the vertically aligned brackets and the pair of inserts of the connector are inserted within the brackets, the back wall of the cup, the vertically aligned brackets, and the inserts of the connector form a closed perimeter surrounding the horizontal bar of the cage.

7. The animal feeding and watering cup system of claim 1, wherein when a bar of a cage is positioned between two adjacent brackets and the pair of inserts of the connector are inserted within the brackets, each of the pair of inserts extends through two of the vertically aligned brackets.

8. An animal feeding and watering cup system configured to connect to bars of a cage, comprising:
    a cup member configured to hold water, food or other material;
    a plurality of brackets positioned on a back wall of the cup;
    the plurality of brackets including a first pair of brackets and a second pair of brackets;
    wherein the first pair of brackets are vertically aligned;
    wherein the second pair of brackets are vertically aligned;
    wherein the first pair of brackets are horizontally aligned with the second pair of brackets;
    wherein each bracket of the plurality of brackets has a pair of sidewalls and a back wall creating a closed periphery when positioned on the back wall of the cup;
    wherein each bracket has an opening configured to receive an insert of a connector;
    a connector having a lip at an upper end and a pair of inserts separated by a single slot that extends downward vertically from the upper end to a lower end;
    the connector having a wedge shape when viewed from a side;

wherein the cup member is configured to be connected to the cage by placing a bar of the cage between adjacent brackets and inserting the connector in openings of the brackets thereby frictionally attaching the cup member to the cage;

wherein the wedge shape of the connector has a consistent taper extending from a upper end of the connector to a lower end of the connector, thereby permitting the connector to be positioned in the openings of the brackets with an infinite number of distances between the back wall of the cup member to facilitate tight clamping of bars of multiple different thicknesses between the connector and the back wall of the cup member; and wherein each opposing first pair and second pair of brackets angles toward one another as they extend from the back wall of the bracket to the back wall of the cup, creating a snug fit with a cage bar.

9. The animal feeding and watering cup system of claim 8, wherein the plurality of brackets is formed of four brackets.

10. The animal feeding and watering cup system of claim 8, wherein the plurality of brackets are positioned in a square pattern on a back wall of the cup member with a space between each bracket.

11. The animal feeding and watering cup system of claim 8, wherein the plurality of brackets are arranged in a square pattern on a back wall of the cup member wherein a space is positioned between each adjacent bracket.

12. The animal feeding and watering cup system of claim 8, wherein the plurality of brackets are square or rectangular in shape.

13. The animal feeding and watering cup system of claim 8, wherein the opening of the plurality of brackets are square or rectangular in shape when viewed from above or below.

14. The animal feeding and watering cup system of claim 8, wherein the cup member includes a thick collar positioned around an upper edge of the cup member.

15. The animal feeding and watering cup system of claim 8, wherein when the pair of inserts of the connector are inserted within the vertically aligned brackets, each pair of vertically aligned brackets and the back wall of the cup form a closed perimeter surrounding one of the pair of inserts of the connector.

16. The animal feeding and watering cup system of claim 8, wherein when a bar of a cage is positioned between two adjacent brackets and the pair of inserts of the connector are inserted within the brackets, each of the pair of inserts extends through two of the vertically aligned brackets.

\* \* \* \* \*